United States Patent
Pawar et al.

(10) Patent No.: US 10,681,592 B1
(45) Date of Patent: Jun. 9, 2020

(54) INVOKING PAGING BY TARGET NETWORK IN RESPONSE TO UE BEING AT EDGE OF SOURCE NETWORK

(71) Applicant: Sprint Spectrum L.P., Overland Park, KS (US)

(72) Inventors: Hemanth B. Pawar, Brambleton, VA (US); Krishna Sitaram, Chantilly, VA (US); Shilpa K. Srinivas, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/807,276

(22) Filed: Nov. 8, 2017

(51) Int. Cl.
*H04W 36/00* (2009.01)
*H04W 68/00* (2009.01)
*H04W 36/08* (2009.01)

(52) U.S. Cl.
CPC ....... *H04W 36/0022* (2013.01); *H04W 36/08* (2013.01); *H04W 68/00* (2013.01)

(58) Field of Classification Search
CPC .. H04W 36/0022; H04W 36/08; H04W 68/00
USPC ........................................................ 370/331
See application file for complete search history.

(56) References Cited

U.S. PATENT DOCUMENTS 7,301,938 B2 11/2007 Ejzak
7,466,991 B2 12/2008 Everson et al.
2008/0318565 A1* 12/2008 Stojanovski ...... H04W 36/0022
455/422.1
2010/0172323 A1 7/2010 Rexhepi et al.
2013/0331054 A1* 12/2013 Kodali .................. H04W 36/14
455/404.1
2016/0345210 A1* 11/2016 Shan ................. H04W 36/0022

OTHER PUBLICATIONS

"VoLTE Signaling and Operations," Award Solutions, LTE University, 2017.
"VoLTE with SRVCC: The second phase of voice evolution for mobile LTE devices," Qualcomm, White Paper, Oct. 2012.
"Circuit-switched fallback to 1x voice: Network architecture, options and performance," Qualcomm, White Paper, Jan. 2013.

\* cited by examiner

*Primary Examiner* — Yemane Mesfin
*Assistant Examiner* — Intekhaab A Siddiquee

(57) ABSTRACT

When a UE is served by a first radio access network (RAN) and is engaged in a voice call such as a VoIP call, a determination will be made that the UE is at an edge of coverage (e.g., threshold poor coverage) of the first RAN and that there is no other adjacent coverage of the first RAN that could support the voice call. In response, signaling will cause a second RAN to page the UE via the first RAN so as to cause the UE to transition from being served by the first RAN to being served by the second RAN. More generally, when a UE has poor coverage of its serving RAN, another RAN will pull the UE to the second RAN by paging the UE to trigger transition of the UE from to the second RAN.

15 Claims, 5 Drawing Sheets

INVOKING PAGING BY TARGET NETWORK IN RESPONSE TO UE BEING AT EDGE OF SOURCE NETWORK

BACKGROUND

A typical radio access network (RAN) includes a number of base stations each configured to provide coverage in which to serve user equipment devices (UEs) such as cell phones, tablet computers, tracking devices, embedded wireless modules, and other wirelessly equipped devices, whether or not user operated. In turn, each base station may sit as a node on a core access network that includes entities such as a network controller, switches and/or gateways, and the core network may provide connectivity with one or more external transport networks such as the public switched telephone network (PSTN) and the Internet. With this arrangement, a UE within coverage of the RAN may engage in air interface communication with a base station and may thereby engage in voice calls or other communications on external transport networks.

Such a RAN may operate with a particular air interface protocol, examples of which include, without limitation, Long Term Evolution (LTE) (using orthogonal frequency division multiple access (OFDMA) and single-carrier frequency division multiple access (SC-FDMA)), Code Division Multiple Access (CDMA) (e.g., 1xRTT and 1xEV-DO), Global System for Mobile Communications (GSM), IEEE 802.11 (WIFI), and BLUETOOTH. Each protocol may define its own procedures for registration of UEs, initiation of communications, handover between base station coverage areas, and other functions.

In accordance with the air interface protocol, each base station may provide wireless service to UEs on one or more carrier frequencies, with the air interface defining various downlink and uplink channels for carrying control signaling and bearer traffic. For instance, on the downlink, the air interface may define channels for carrying reference signals, paging signals, bearer data, and other information from the base station to UEs. And on the uplink, the air interface may define channels for carrying access requests, measurement reports, bearer data, and other information from UEs to the base station.

When a UE initially enters into coverage of such a RAN, the UE may scan for a strongest base-station coverage area in which to operate, and the UE may then engage in signaling to register for service with that base station and the RAN. The UE may then be served by the base station and the RAN and may engage in voice calls or other communications as noted above.

While so served, the UE may also from time to time monitor coverage strength from its serving base station and from other base stations of the RAN, to help ensure that the UE is served with sufficiently strong coverage and perhaps with the strongest available coverage. If the UE's coverage from its serving base station becomes threshold weak and another base station's coverage becomes threshold strong (e.g., threshold stronger than the serving base station's coverage or than a defined level), the UE may then engage in signaling with its serving base station, and the base station and/or one or more other entities may responsively coordinate handover of the UE to the stronger coverage.

Overview

A RAN could be configured to provide UEs with packet-data communication service. For instance, the RAN could include a gateway system that connects with an external packet-data network such as the Internet, and the RAN could be configured to establish bearer channels for carrying packet data between served UEs and the gateway system, so that UEs can engage in packet-data communication on the external network.

By way of example, base stations of an LTE RAN are interfaced with a gateway system including one or more serving gateways (SGWs) and one or more packet-data-network gateways (PGWs) that provide connectivity with a packet-data transport network. When a UE is within coverage of an LTE base station (evolved-Node-B (eNodeB)) and registers for service with the LTE RAN, a network controller (mobility management entity (MME)) coordinates setup for the UE of one or more bearers (virtual packet tunnels) that extend between the UE and a PGW, enabling the UE to engage in packet-data communication on the transport network, via the bearer(s) and the PGW.

With such an arrangement, the RAN could also be configured to support voice-over-Internet-Protocol (VoIP) call service for UEs. For instance, the RAN may provide connectivity with an Internet Multimedia Subsystem (IMS) platform on the transport network, the IMS platform may be configured to provide VoIP call service, and the RAN may be configured to establish VoIP bearer channels for its served UEs.

As an example, a UE served by an LTE RAN may engage in VoIP call setup signaling with the IMS platform, via the LTE network, to set up a VoIP call. And the LTE RAN may responsively also set up for the UE a VoIP bearer between the UE and the PGW, with quality of service parameters appropriate for carrying VoIP call communications (packetized voice data), and the UE's serving eNodeB may reserve air interface resources appropriate for supporting the VoIP call. The UE may then engage in the VoIP call through communication with the IMS platform, via the UE's serving eNodeB and the VoIP bearer through the LTE network.

Alternatively, a RAN that provides packet-data communication service (such as an LTE RAN) may not support VoIP call service. For instance, the RAN's base stations may not be configured to support VoIP call service, and/or one or more other aspects of the RAN may not be configured to support VoIP call service. In that case, the RAN may instead interwork with another RAN that supports voice call service, enabling UEs to hand over to that other RAN when necessary to place or receive voice calls. In practice, the other RAN could be a legacy circuit-switched RAN (such as a CDMA RAN) with coverage throughout the same area as the packet-data RAN and could be operated by the same provider as the packet-data RAN, and the interworking to support voice call service could be a circuit-switched-fallback (CSFB).

Considering a hybrid LTE/CDMA system, for instance, to facilitate CSFB, a controller of the LTE RAN, such as an MME, could be configured with a communication interface, such a an S102 interface, with an interworking server (IWS) that is interfaced or integrated with a controller, such as a mobile switching center (MSC), of the CDMA RAN. When a UE registers for service with the LTE RAN, the UE could then further engage in signaling with the CDMA RAN, via the LTE RAN (via the MME and the MME's connection with the IWS), to register for service with the CDMA RAN. This way, the CDMA RAN would learn that the UE is reachable via the LTE RAN, so that the CDMA RAN can engage in appropriate CSFB signaling to establish voice calls.

Once the UE has thus engaged in CSFB registration with the CDMA RAN, the CDMA RAN may at some point receive a new voice call placed to the UE, and the CDMA RAN may responsively engage in CSFB signaling via the LTE RAN to cause the UE to transition from LTE service to CDMA service so that the UE can be served with the new voice call via CDMA.

In particular, an MSC of the CDMA RAN could respond to the arrival of the new call for the UE by generating a CDMA page message and delivering the page message to the IWS for transmission to the UE, based on the UE's registration indicating that the UE is accessible via the LTE network. The IWS could then encapsulate the page message in a generic-format message for delivery to the UE and could transmit the message via the S102 interface to the MME of the LTE network. The encapsulated message may then flow from the MME to the UE's serving eNodeB, and the eNodeB could transmit the message to the UE via the LTE air interface.

When the UE receives this CDMA page message, the UE could then respond with an extended service request (ESR) message via the LTE air interface to the eNodeB. And the eNodeB could then provide the UE with measurement objects directing the UE to scan for CDMA coverage and to report to the eNodeB the detected coverage. If the UE finds and reports CDMA coverage of sufficient strength, then the UE could then transmit to the eNodeB a CDMA page response message (PRM), to which the eNodeB could append the UE's CDMA measurements, and which would flow transparently via the MME to the IWS. Based on the UE's CDMA measurements, the MSC could then reserve a CDMA traffic channel in a CDMA coverage area, and the IWS could convey information about this traffic channel assignment to the UE in a universal handoff direction message (UHDM) tunneled via the LTE network and eNodeB to the UE. And the UE could then tune to the CDMA air interface and engage in the voice call via CDMA.

In practice, when serving a UE that supports both VoIP call service and CSFB call service, an LTE RAN (or other such RAN) may thus be configured to provide either VoIP service or CSFB service and could broadcast information indicating which process the RAN supports. For instance, the LTE RAN could be configured to provide VoIP service, in which case the UE served by the LTE RAN could place/receive voice calls as VoIP calls and could engage in the VoIP calls via the LTE air interface and LTE RAN. Alternatively, the LTE RAN could be configured to provide CSFB call service, in which case the UE served by the LTE RAN could place/receive voice calls through CSFB call-setup signaling via the LTE RAN with a fallback RAN such as a CDMA RAN, and upon setup of such a call could transition from LTE to CDMA to engage in the call via the CDMA air interface and CDMA RAN.

Unfortunately, however, a problem can arise if a UE is engaged in a VoIP call served by the LTE RAN (or other such RAN) and is operating at a physical location that is at an edge of the LTE RAN's effective VoIP service area. This could happen, for instance, if the UE that is engaged in the VoIP call is at an edge of its serving eNodeB's coverage area and if there is no adjacent LTE coverage area to which the UE could hand over, or there is adjacent LTE coverage to which the UE could hand over but the adjacent coverage does not support VoIP service. In this situation, the UE's effective VoIP coverage may become so poor that the UE may experience a VoIP call drop.

Disclosed herein is a method and system to help address this situation. In accordance with the disclosure, when a UE is served by a first RAN (e.g., an LTE RAN), a determination will be made that the UE is at an edge of coverage (e.g., threshold poor coverage) of the first RAN. And in response to at least this determination, signaling will cause a second RAN (e.g., a CDMA RAN) to page the UE via the first RAN so as to cause the UE to transition to being served by the second RAN. Thus, in effect, when the UE has poor coverage of the first RAN, the second RAN will pull the UE to the second RAN by paging the UE to trigger transition of the UE from the first RAN to the second RAN.

More specifically, if a UE is engaged in a VoIP call served by the first RAN, a determination can be made that the UE is at an effective edge of VoIP coverage of the first RAN. And in response to at least this determination, signaling could cause the second RAN to engage in CSFB signaling with the UE via the first RAN—as if the second RAN had received a new call placed to the UE—to cause the UE to transition from the first RAN to the second RAN. Further, the UE's voice call would be transferred from being via the first RAN to being via the second RAN. The UE could then continue to engage in the call via the second RAN.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of a system that includes an LTE RAN and a legacy CDMA RAN. It should be understood, however, that the disclosed principles can extend to other air interface protocols and other network arrangements as well, with variations where appropriate. Further, even within the context of the hybrid LTE-CDMA system described, numerous variations from the specific arrangements and processes described are possible. For instance, various described machines, connections, functions, and other elements could be added, omitted, distributed, re-located, re-ordered, combined, or changed in other ways.

Figure 1:
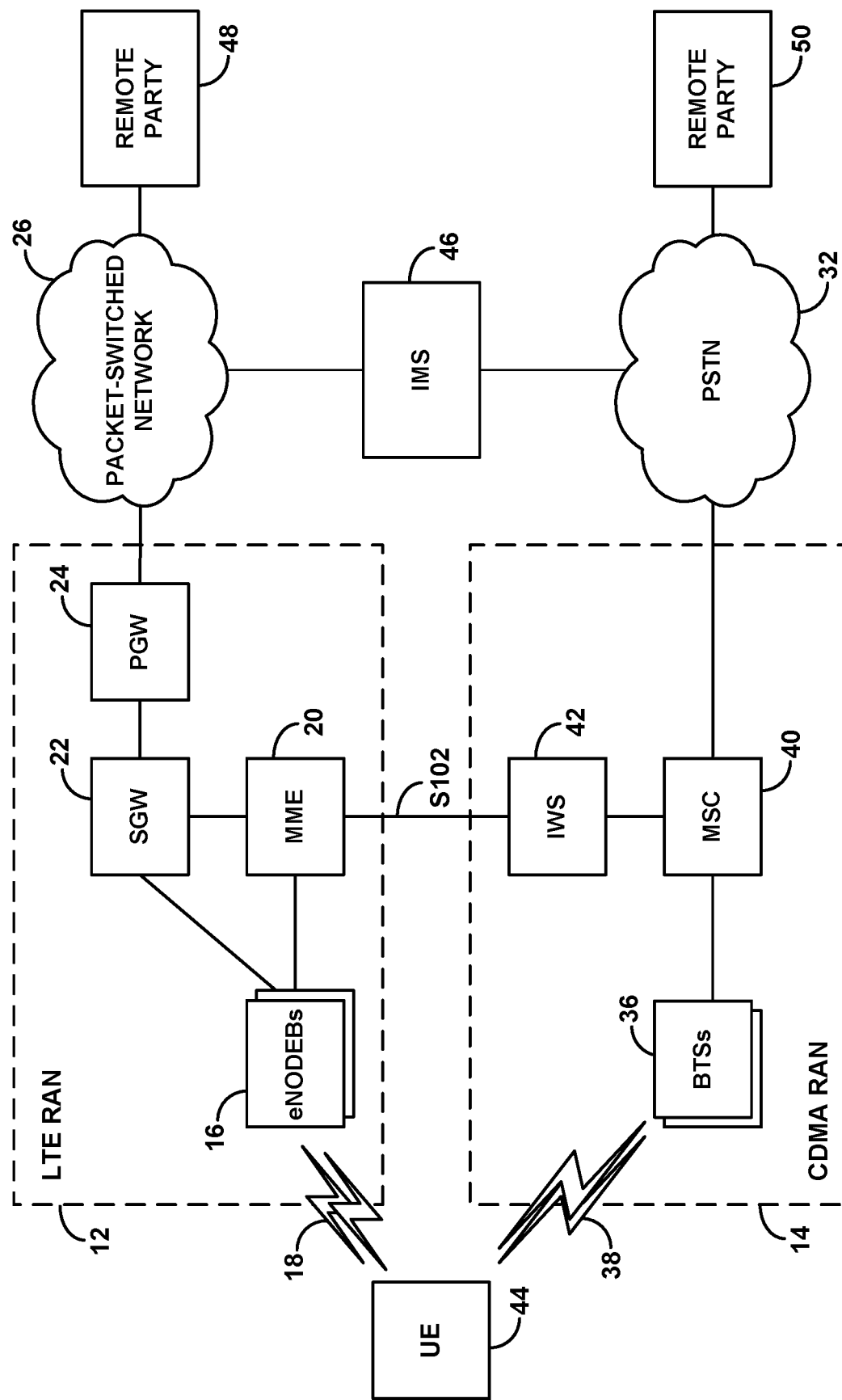
FIG. 1 is a simplified block diagram of an example wireless communication system in which features of the present disclosure can be implemented.

FIG. 1 is a simplified block diagram of the example system, including an LTE RAN 12 and a CDMA RAN 14. In the example system, the LTE RAN primarily serves UEs with wireless packet data communication service. Whereas the CDMA RAN primarily serves UEs with wireless circuit-switched voice call service. These RANs may be owned or operated by a common wireless service provider, enabling the provider to serve UEs with high speed packet data service through the LTE RAN and traditional cellular voice call service through the CDMA RAN.

The LTE RAN 12 in the example system is shown including multiple representative LTE eNodeBs 16, each of which includes an antenna structure and associated equipment for providing a respective LTE coverage area 18 in which UEs can be served by the eNodeB and thus by the LTE RAN. The eNodeB is then shown having a communication interface with an MME 20 that functions as a signaling controller for the LTE RAN. Further, the eNodeB is also shown having a communication interface with an SGW 22, which is in turn shown having a communication interface with a PGW 24 that provides connectivity with a packet-switched network 26, and the MME is shown having a communication interface with the SGW. In practice, the illustrated components of the LTE RAN could sit as nodes on a private packet-switched network owned by an operator of the LTE RAN. Therefore, the various communication interfaces could be tunnels defined in that network.

The CDMA RAN 14, on the other hand, is shown including multiple representative CDMA base stations 36 known as a base transceiver stations (BTSs), each of which includes an antenna structure and associated equipment for providing one or more CDMA coverage areas 38 (e.g., CDMA sectors) in which UEs can be served by the BTS and thus by the CDMA RAN. The BTS is then shown in communication (possibly through a base station controller (BSC) (not shown)) with an MSC 40 that provides connectivity with the PSTN 32 and that functions to set up call connections over the PSTN primarily for UEs served by the CDMA RAN.

Further shown in FIG. 1 is then an IWS 42, which serves as a signaling intermediary between the LTE RAN and the CDMA RAN to facilitate CSFB service. The IWS, which may be an element of the CDMA RAN, has an inter-network S102 interface with the MME of the LTE RAN and is further interfaced or integrated with the MSC of the CDMA RAN. Other arrangements are possible as well.

FIG. 1 illustrates a representative UE 44 located within coverage of the LTE RAN and coverage of the CDMA RAN. This representative UE is a hybrid telephony device (e.g., cell phone or other such device), equipped to support both LTE service and CDMA service and is thus capable of being served by both the LTE RAN and the CDMA RAN and engaging in voice calls served by either RAN. In practice, the UE could prioritize being served by the LTE RAN but could be configured to support CSFB service. Therefore, upon initial entry into coverage of the LTE RAN, the UE could connect with the eNodeB and attach with the LTE network by engaging in signaling with the eNodeB and in turn with the MME 20. Further, the UE could then register with the CDMA RAN via the LTE RAN. In particular, the UE could transmit a CDMA registration request to the eNodeB, and the request would flow from the eNodeB to the MME and over the S102 interface to the IWS and in turn to the MSC, thereby registering the UE for CDMA service without the UE leaving LTE.

Shown further in the arrangement of FIG. 1 is an IMS platform 46 accessible via packet-switched network 26 and connected (likely through a media gateway system (not shown)) with the PSTN. The IMS platform (IMS) 46 includes components such as proxy servers, control functions, media servers, and the like, to support VoIP call connections and associated signaling.

With this arrangement, when UE 44 is served by an eNodeB 16, the UE could engage in VoIP call-setup signaling with IMS 46 to set up a voice call with a remote party (e.g., with a remote party 48 accessible on the packet-switched network 26 or with a remote party accessible on the PSTN 32). For instance, the UE 44 could engage in Session Initiation Protocol (SIP) signaling, via the LTE RAN, with the IMS to establish a packet-based real-time voice call leg between the UE and the IMS, and the IMS establish or have a call leg with the remote party and could bridge those call legs together to allow the UE to engage in a voice call with the remote party. Further, the IMS could signal to the LTE RAN to cause the LTE RAN to establish a VoIP bearer for the UE, through which the UE could engage in the call, and the UE's serving eNodeB could reserve appropriate resources for the VoIP call and could serve the UE accordingly.

As the UE engages in this voice call with the remote party via the LTE RAN and the IMS, the UE may move throughout coverage of the LTE RAN and may from time to time hand over from one LTE eNodeB to another as discussed above. Namely, as the UE moves into threshold poor coverage of its serving LTE eNodeB and into threshold strong enough coverage of another LTE eNodeB, the UE may signal to its serving eNodeB, and the serving eNodeB may responsively invoke a process of handing over the UE to the other eNodeB, with the UE's existing VoIP call being transferred within the LTE RAN to the other eNodeB as well, so that the UE can continue the VoIP call via the new eNodeB.

Unfortunately, however, one or more eNodeBs within the LTE RAN may not support such VoIP call service. By way of example, certain eNodeBs may lack the software and/or hardware that may be necessary (or deemed necessary) for the eNodeB to be able to support VoIP service. For instance, eNodeBs manufactured by certain vendors and/or in certain markets may support VoIP service, while eNodeBs manufactured by other vendors and/or in other markets may not support VoIP service. Or eNodeBs of one type (e.g., macro eNodeBs) might support VoIP service, while eNodeBs of another type (e.g., relay eNodeBs, or small cell eNodeBs) might not support VoIP service. Further, an eNodeB's support for VoIP service could be a setting based on one or more factors or could be a general attribute of the eNodeB. Other examples are possible as well.

As a result, as noted above, it is possible that while the UE is served by a given eNodeB and is engaged in VoIP call, the UE may be at a position where the UE has threshold poor coverage of its serving eNodeB but where the only other LTE eNodeB coverage that the UE detects for possible handover is provided by another eNodeB that does not support VoIP service. Alternatively, it is possible that the UE may detect no other LTE coverage at its current location.

In accordance with the present disclosure, while the UE is engaged in this voice call, the UE, its serving eNodeB, and/or another entity could detect that the UE is at an edge of coverage of the serving eNodeB and that there is no adjacent coverage of the LTE RAN that could support the voice call. And in response to at least detecting this situation, the entity and/or another entity could then the engage in signaling that is configured to cause the CDMA RAN to engage in CSFB paging of the UE to pull the UE to the CDMA RAN so that the UE can continue the voice call via the CDMA RAN.

The act of detecting that the UE is at an edge of coverage of its serving eNodeB could take various forms. For instance, this could involve the UE detecting that downlink reference signal strength or quality from the serving eNodeB is lower than a predefined threshold level (e.g., a level deemed to represent sufficient distance from the eNodeB), and/or the eNodeB receiving a report of such poor downlink coverage from the UE and/or detecting that uplink signal strength or quality from the UE is lower than a predefined threshold level, in either case establishing that the UE is likely at an edge of the eNodeB's coverage. Alternatively or additionally, this could involve the UE and/or the eNodeB determining the geographic location of the UE (using any location-determination mechanism now known or later developed) and comparing that location with pre-established coverage-mapping data indicating an edge of the eNodeB's coverage, to thereby determine that the UE is at an edge of the eNodeB's coverage. Further, the act of determining that the UE is at the edge of coverage could include determining from a various signal strength and/or location data points over time that the UE has progressively moved toward and/or is progressively moving toward the edge of coverage.

Further, the act of determining that there is no adjacent coverage of the LTE RAN that could support the voice call could take various forms as well, in this instance involving a determination that there is no adjacent coverage of the LTE RAN that supports VoIP call service. This analysis could additionally be based on the UE's geographic location, with the determination being based on the UE being located not only at an edge of the serving eNodeB's coverage but also that the UE is at or approaching a position where there would be no adjacent coverage of the LTE RAN that would support the UE's ongoing VoIP call.

In a representative implementation, the LTE RAN could include data that specifies for each eNodeB whether the eNodeB supports VoIP service. Each eNodeB could be configured to broadcast a system information parameter (e.g., in a System Information Block (SIB) or the like) indicating whether the eNodeB supports VoIP service. Further each eNodeB could be provisioned with a neighbor list indicating for each of its neighbor eNodeBs whether the neighbor eNodeB supports VoIP service. Still further, the MME or another central entity in the LTE network could include such information for each of various eNodeBs in the network. And yet further, absence of such information for an eNodeB could be deemed to mean by default that the eNodeB does not support VoIP service or perhaps that the eNodeB supports VoIP service.

Thus, once the UE has detected strong enough LTE target coverage for possible handover, the UE could determine whether the eNodeB that provides that target coverage would support VoIP service, by reading a broadcast system parameter indicating whether the eNodeB supports VoIP service. Alternatively or additionally, when the eNodeB has received from the UE a report of the target coverage for possible handover, the eNodeB could determine whether the target eNodeB that provides the coverage support VoIP service, by receiving an indication of this determination from the UE, by reference to a neighbor list, and/or by querying the MME. Other mechanisms are possible as well.

Further, as noted above, the UE or eNodeB could also detect that the UE is at an edge of coverage of the eNodeB and that there is no adjacent LTE coverage that would support the VoIP call by determining that the UE is at an edge of coverage of the eNodeB and that there is no adjacent LTE coverage (regardless of VoIP support). For instance, the UE or eNodeB could detect this situation if the UE has not reported threshold strong enough target LTE coverage for possible handover.

In turn, the act of engaging in signaling that is configured to cause the CDMA RAN to engage in CSFB paging of the UE to pull the UE to the CDMA RAN, so that the UE can continue the voice call via the CDMA RAN, could be carried out by the same entity and/or by another entity and could involve signaling with various entities, such as the MME and/or the IMS, to trigger or otherwise help achieve this result.

By way of example, upon the UE detecting that it is at the edge of coverage of the serving eNodeB and that there is no adjacent LTE coverage that could support the VoIP call, the UE could generate and transmit a control-plane signaling message to the MME as an indication of this situation and/or could generate and transmit a user-plane signaling message to the IMS (e.g., by injecting the indication into the UE's VoIP call flow to the IMS, in a separate packet and/or in a packet header or the like) as an indication of this situation. Alternatively or additionally, upon detecting this situation, the serving eNodeB could generate and transmit a control-plane signaling message to the MME as an indication of the situation and/or could generate and transmit such an indication to the IMS (e.g., by injecting the indication into the UE's VoIP call flow to the IMS, in a separate packet and/or in a packet header or the like). These or other signaling messages described herein could be newly defined messages and/or could be variants of existing standard messages.

Upon the MME receiving such signaling (e.g., from the UE or the eNodeB), the MME could then programmatically respond by signaling via the S201 interface to the IWS, and the IWS could in turn programmatically interwork with the MSC. In response to this signaling, the MSC could then respond programmatically by (i) setting up a call leg between the IMS and the MSC, with the IMS programmatically bridging that call leg with the remote-party call leg and (ii) initiating CSFB paging of the UE via LTE in largely the same manner that the MSC would do normally upon receipt of a new call to the UE. For instance, the MSC could engage in SIP signaling (possibly with Signaling System #7 (SS7) signaling via a media gateway) with the IMS to set up a call leg tied to an anchor point (e.g., an access transfer control function/gateway) of the call at the IMS, and the MSC could initiate CSFB paging of the UE.

As described above, the CSFB paging of the UE via LTE could then be received by the UE via LTE, with the UE treating the incoming CSFB paging similar to a call-waiting signal as the UE is currently engaged in the VoIP call via LTE. To facilitate the present process, the UE could then programmatically respond to the CSFB page much as the UE would respond to a CSFB page for a normal, new incoming call. And following the CSFB process as described above for instance, the UE could then transition from LTE to CDMA.

Meanwhile, upon establishing the call leg with the IMS, tied with the remote party with whom the UE is currently engaged in the voice call, the MSC could then connect that call through to the UE via CDMA. Further, the MSC could signal to the UE via CDMA or via the LTE network, to cause the UE to drop the LTE leg of the call, and/or the MSC could signal to the IMS to cause the IMS to drop the LTE leg of the call. And the UE could then continue the voice call via CDMA and via the MSC-IMS connection.

Alternatively, upon the IMS receiving signaling from the UE and/or from the eNodeB, the IMS could programmatically respond by (i) setting up a call leg between the IMS and the MSC, bridging that call leg with the remote-party call leg, and (ii) causing the MSC to initiate CSFB paging of the UE via LTE. For instance, the IMS could engage in SIP signaling (possibly with SS7 signaling via a media gateway) with the MSC to set up a call leg that is tied to an anchor point of the call at the IMS, and to cause the MSC to initiate CSFB paging of the UE via LTE as described above.

Thus, in response to this signaling from the IMS, the MSC could programmatically work with the IMS to set up a call leg between the MSC and the IMS, which the IMS would bridge with the remote-party call leg, and the MSC could programmatically initiate CSFB paging of the UE via LTE in largely the same manner that the MSC would do normally upon receipt of a new call to the UE. Here again, the CSFB paging of the UE via LTE could then be received by the UE via LTE, with the UE treating the incoming CSFB paging similar to a call-waiting signal as the UE is currently engaged in the VoIP call via LTE. And the UE could then programmatically respond to the CSFB page much as the UE would respond to a CSFB page for a normal, new incoming call. And following the CSFB process as described above for instance, the UE could then transition from LTE to CDMA.

Meanwhile here as well, upon establishing the call leg with the IMS, tied with the remote party with whom the UE is currently engaged in the voice call, the MSC could then connect that call through to the UE via CDMA. Further, the MSC could signal to the UE via CDMA or via the LTE network, to cause the UE to drop the LTE leg of the call, and/or the MSC could signal to the IMS to cause the IMS to drop the LTE leg of the call. And the UE could then continue the voice call via CDMA and via the MSC-IMS connection.

This process thus makes use of CSFB call initiation to effectively pull a UE from LTE to CDMA in response to the UE being at an edge of VoIP coverage of the LTE RAN. While CSFB call initiation may normally be used to set up a new call, this process leverages CSFB as an efficient means to transfer an existing call from LTE to CDMA. More generally, this process can leverage CSFB or the like as an efficient means to transfer an ongoing call from a first RAN to a second RAN, in response to determining that the UE at issue is at an edge of effective coverage of the first RAN. Still more generally, this process can provide for having a second RAN page a UE via a first RAN to pull the UE to service of the second RAN in response to the UE being at an edge of effective coverage of the first RAN.

Figure 2:
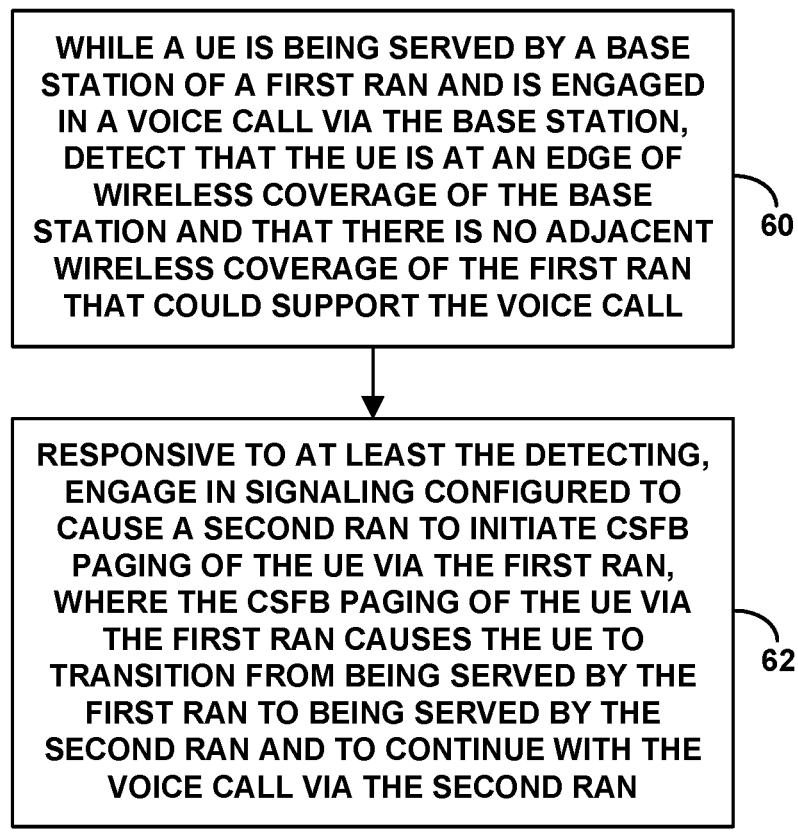
FIG. 2 is a flow chart depicting an example method in accordance with the disclosure.

FIG. 2 is next a flow chart depicting a method that could be carried out in accordance with the present disclosure, to control handover of a UE from being served by a first RAN to being served by a second RAN. As shown in FIG. 2, at block 60, the method includes, while the UE is being served by a base station of the first RAN and is engaged in a voice call via the base station, detecting that the UE is at an edge of wireless coverage of the base station and that there is no adjacent wireless coverage of the first RAN that could support the voice call. At block 62, the method then includes, responsive to at least the detecting, engaging in signaling configured to (ultimately) cause a second RAN to initiate CSFB paging of the UE via the first RAN, where the CSFB paging of the UE via the first RAN causes the UE to transition from being served by the first RAN to being served by the second RAN and to continue with the voice call via the second RAN.

In line with the discussion above, this method could be carried out by the base station, the UE, and/or one or more other entities. Further, the first RAN could be an LTE RAN, and the second RAN could be a CDMA RAN. Still further, note that the act of engaging in signaling configured to cause an action to occur could involve engaging in signaling that triggers possibly further signaling or action and ultimately causes or proximately results in the action occurring.

In an example implementation, for instance, the voice call could be served by an IMS to which both of the RANs are communicatively connected (For instance, the IMS could operate as discussed above, including bridging the call with a remote party, and/or coordinating setup and control of the call). Further, the signaling that is configured to cause the second RAN to initiate cause the second RAN to initiate CSFB paging of the UE via the first RAN could include signaling to the IMS, with the signaling to the IMS causing the IMS to signal to the second RAN to cause the second RAN to initiate the CSFB paging of the UE as discussed above. Alternatively or additionally, the signaling could include signaling to a controller of the first RAN (e.g., to an MME), with that signaling causing the controller of the first RAN to signal to the second RAN to cause the second RAN to initiate the CSFB paging of the UE.

Figure 3:
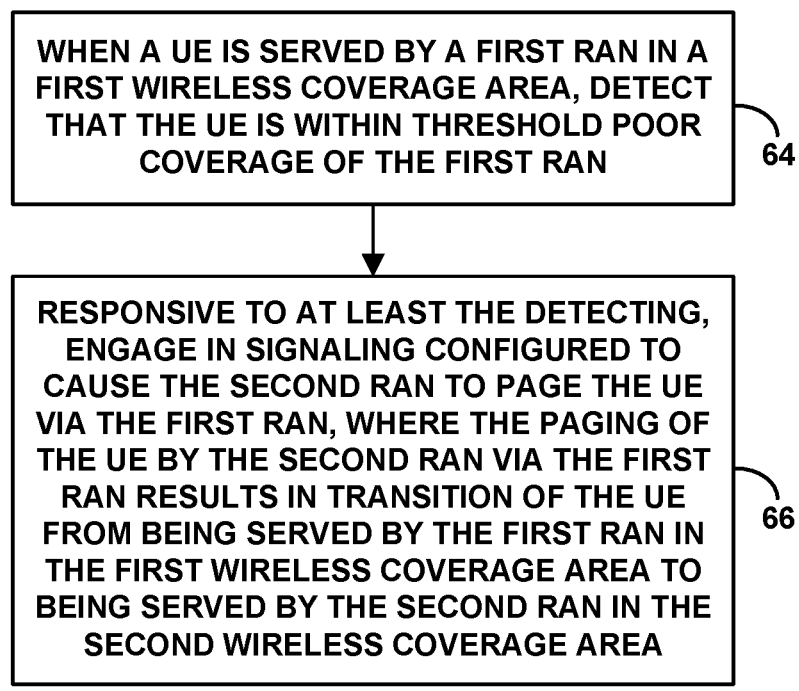
FIG. 3 is another flow chart depicting an example method in accordance with the disclosure.

FIG. 3 is next another flow chart depicting a method that could be carried out in accordance with the present disclosure, to control handover of a UE from being served by a first RAN that provides first wireless coverage to being served by a second RAN that provides second wireless coverage. As shown in FIG. 3, at block 64, the method includes, when the UE is served by the first RAN in the first wireless coverage area, detecting that the UE is within threshold poor coverage of the first RAN. And at block 66, the method includes, responsive to at least the detecting, engaging in signaling configured to (ultimately) cause the second RAN to page the UE via the first RAN, where the paging of the UE by the second RAN via the first RAN results in transition of the UE from being served by the first RAN in the first wireless coverage area to being served by the second RAN in the second wireless coverage area.

In line with the discussion above, the first RAN could be an LTE RAN, and the second RAN could be a CDMA RAN, among other possible examples. Further, the first RAN could include a first base station that provides the first wireless coverage area. And the method could be carried out by that first base station, by the UE, and/or by one or more other entities.

In addition, the method could be carried out while the UE is engaged in a call served by an IMS, and the act of transitioning the UE from being served by the first RAN in the first coverage area to being served by the second RAN in the second coverage area could involve handing over the call from being via the first RAN to being via the second RAN. For instance, the IMS could maintain a call leg with a remote party and could establish a new call leg via the second RAN drop the initial call leg via the first RAN. Further, the method could be carried out while the UE is engaged in a call, and the paging could comprise CSFB paging.

In addition, as discussed above, the act of engaging in the signaling configured to cause the second RAN to page the UE via the first RAN could involve transmitting to the IMS at least one signaling message configured to cause the IMS to transmit to the second RAN at least one signaling message configured to cause the second RAN to page the UE via the first RAN. Alternatively or additionally, the act of engaging in the signaling configured to cause the second RAN to page the UE via the first RAN could involve transmitting to a controller of the first RAN at least one signaling message configured to cause the controller of the first RAN to transmit to the second RAN at least one signaling message configured to cause the second RAN to page the UE via the first RAN.

Still further, as discussed above, the UE could be engaged in a VoIP call via the first base station, and the method could additionally involve determining that the UE is at or approaching a position where there is no adjacent wireless coverage area of the first RAN that could support the VoIP call, and the act of engaging in the signaling could be responsive to at least the detecting and the determining.

Figure 4:
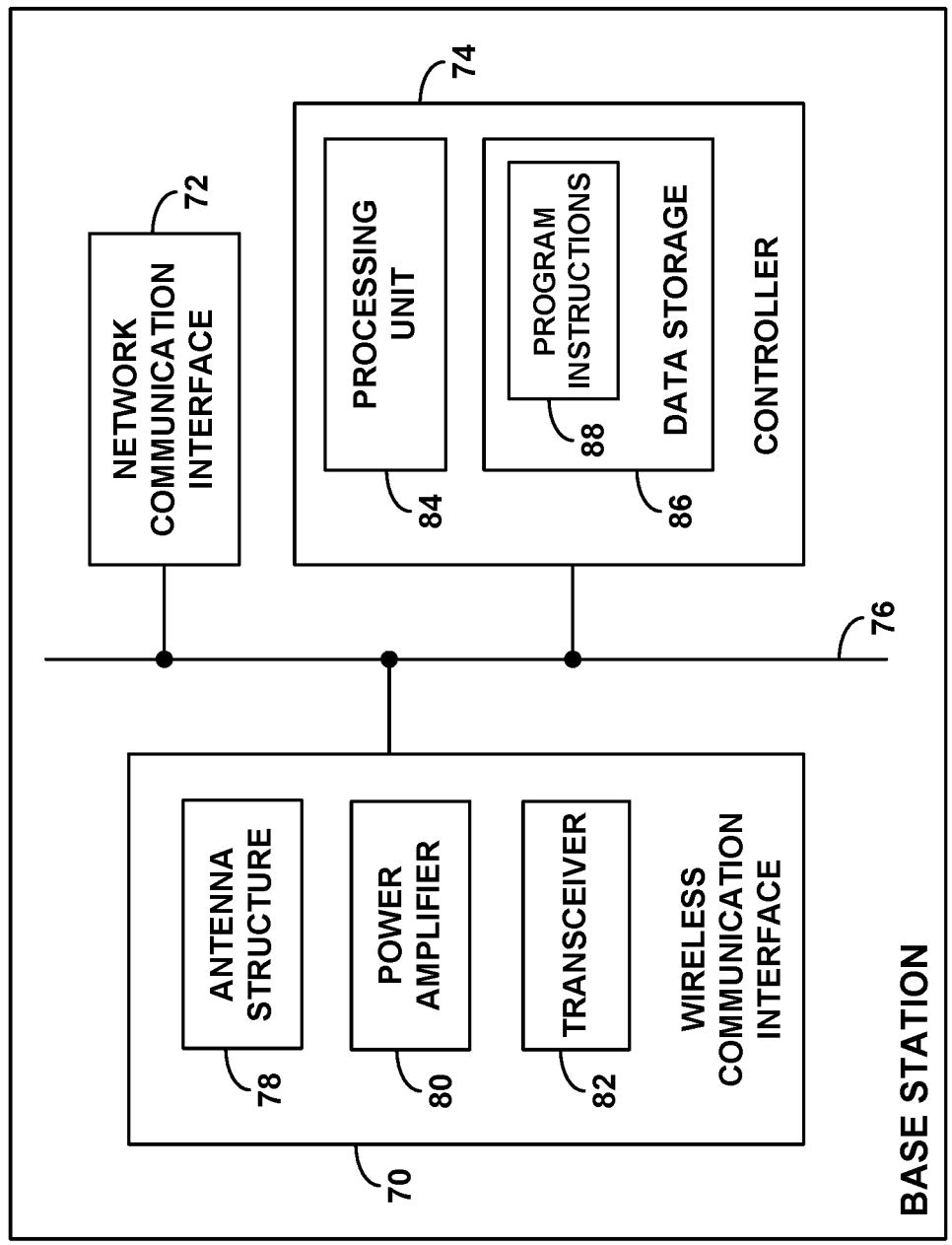
FIG. 4 is a simplified block diagram of an example base station operable in accordance with the disclosure.

FIG. 4 is next a simplified block diagram of an example base station, showing some of the components that a base station could include in an example implementation. As shown in FIG. 4, the base station includes a wireless communication interface 70, a network (e.g., backhaul) communication interface 72, and a controller 74. These components are shown communicatively linked together by a system bus or other communication link 76, but it will be understood that the components could alternatively be integrated together or distributed in various ways. For instance, aspects of the controller 74 could be provided in a chipset that implements functions of the wireless communication interface 70. Other examples are possible as well.

As shown, wireless communication interface 70 could include an antenna structure (e.g., one or more antennas) 78, which, together with a power amplifier 80 and a transceiver/radio 82, facilitates air interface communication (transmitting and receiving) over an air interface and thus communicating with and serving UEs over the air interface. Thus, the wireless communication interface could be configured to provide a wireless coverage area, and the base station could serve a representative UE in the wireless coverage area.

Network communication interface 72 could then include a wired or wireless network interface, such as an Ethernet interface, through which the base station could engage in network communication with other entities of a representative system.

Controller 74 could include a processing unit (e.g., one or more microprocessors or other processors) 84, non-transitory data storage 86, and program instructions 88 stored in the non-transitory data storage and executable by the processing unit to carry out various operations described herein.

For instance, the operations could include (i) detecting when the UE is at an edge of coverage of the wireless coverage area, (ii) responsive to at least the detecting, transmitting via the network communication interface a signaling message configured to cause the second RAN to page the UE via the first RAN, wherein the paging results in transition of the UE from being served by the first RAN to being served by the second RAN.

Various features described above can be incorporated in this context as well, and vice versa. For example, the UE could be engaged in a call served by an IMS, and the act of transmitting the signaling message configured to cause the second RAN to page the UE via the first RAN could involve transmitting the signaling message directly or indirectly to the IMS, and the IMS could in turn engage in signaling configured to cause the second RAN to page the UE via the first RAN. Alternatively, the act of transmitting the signaling message configured to cause the second RAN to page the UE via the first RAN could involve transmitting the signaling message to a controller of the first RAN, and the controller could in turn engage in signaling configured to cause the second RAN to page the UE via the first RAN.

Still further, the paging of the UE could comprise CSFB paging. Moreover, the UE could be engaged in a VoIP call via the base station, and the operations can additionally include determining that the UE is at a position where there is no adjacent wireless coverage area of the first RAN that could support the VoIP call, in which case the transmitting of the signaling message configured to cause the second RAN to page the UE via the first RAN could be responsive to at least the detecting and the determining.

Figure 5:
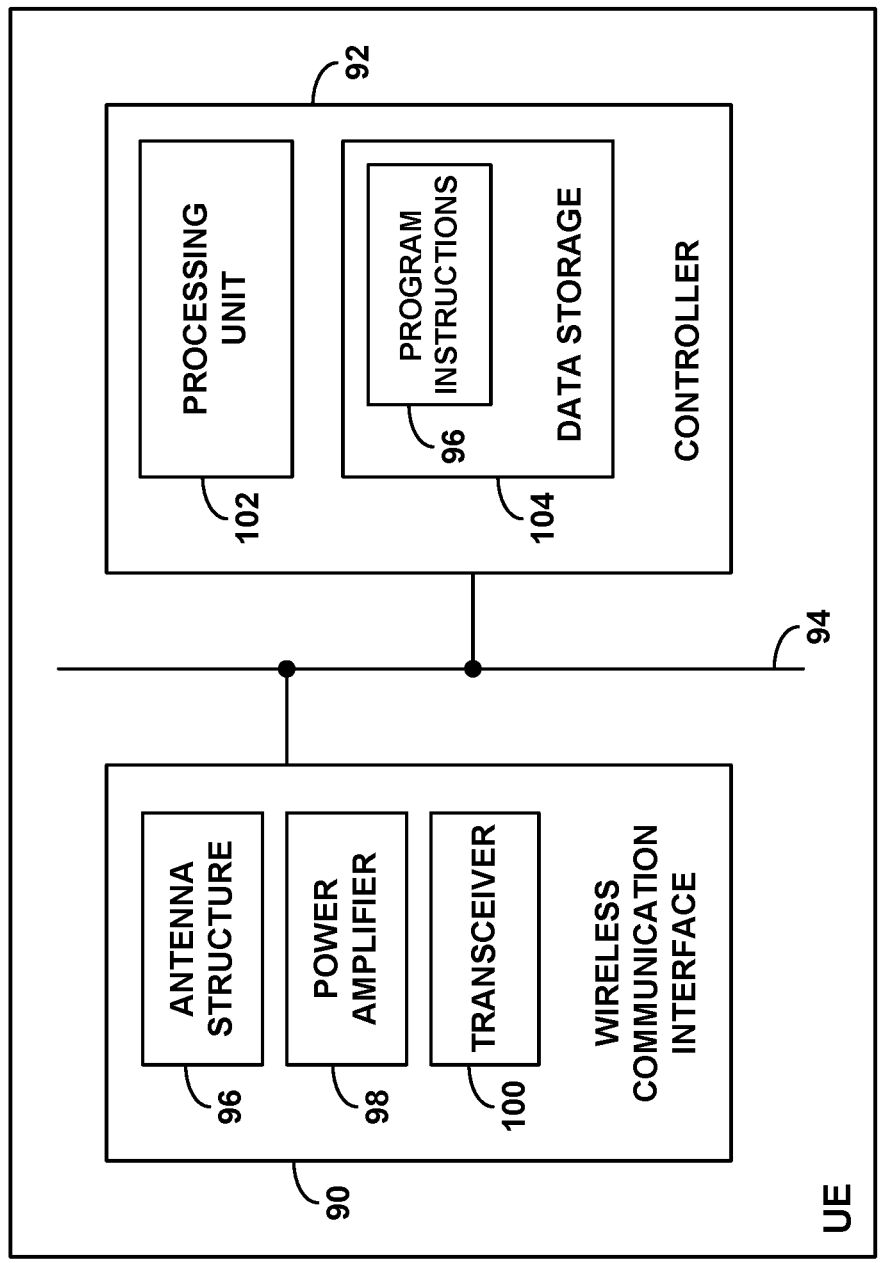
FIG. 5 is a simplified block diagram of an example UE operable in accordance with the disclosure.

Finally, FIG. 5 is a simplified block diagram of an example UE, showing some of the components that a UE could include in an example implementation. As shown, the UE includes a wireless communication interface 90 and a controller 92, which could be integrated together or otherwise communicatively linked by a system bus, network, or other connection mechanism 94.

Wireless communication interface 90 could include an antenna structure 96, a power amplifier 98, and a transceiver/radio 100, cooperatively enabling the UE to engage in air interface communication. And controller 92 could comprise a processing unit 102 (e.g., one or more processors), non-transitory data storage 104 (e.g., one or more volatile and/or non-volatile storage components), and program instructions 106 stored in the data storage 104 and executable by the processing unit 102 to carry out various UE operations described herein. Other features described above can be applied in this context as well, and vice versa.

Exemplary embodiments have been described above. Those skilled in the art will understand, however, that changes and modifications may be made to these embodiments without departing from the true scope and spirit of the invention.

We claim:

1. A method of controlling handover of a user equipment device (UE) from being served by a first radio access network (RAN) to being served by a second RAN, the method comprising:
   when the UE is being served by a base station of the first RAN and is engaged in a voice call via the base station, detecting that the UE is at an edge of wireless coverage of the base station and that there is no adjacent wireless coverage of the first RAN that could support the voice call; and
   responsive to at least the detecting, engaging in signaling configured to cause a second RAN to initiate circuit-switched-fallback (CSFB) paging of the UE via the first RAN, wherein the CSFB paging of the UE via the first RAN causes the UE to transition from being served by the first RAN to being served by the second RAN and to continue with the voice call via the second RAN,
   wherein engaging in signaling comprises an operation selected from the group consisting of (i) if the call is served by an Internet Multimedia System (IMS) to which both the first and second RANs provide connectivity, signaling to the IMS, wherein signaling to the IMS causes the IMS to signal to the second RAN to cause the second RAN to initiate the CSFB paging of the UE, and (ii) signaling to a controller of the first RAN, wherein signaling to the controller of the first RAN causes the controller of the first RAN to signal to the second RAN to cause the second RAN to initiate the CSFB paging of the UE.

2. The method of claim 1, carried out by the base station.

3. The method of claim 1, carried out by the UE.

4. The method of claim 1, wherein the first RAN is a Long Term Evolution (LTE) RAN, and wherein the second RAN is a Code Division Multiple Access (CDMA) RAN.

5. A method for controlling handover of a user equipment device (UE) from being served by a first radio access network (RAN) that provides a first wireless coverage area to being served by a second RAN that provides a second wireless coverage area, the method comprising:
   when the UE is served by the first RAN in the first wireless coverage area, detecting that the UE is within threshold poor coverage of the first RAN; and
   responsive to at least the detecting, engaging in signaling configured to cause the second RAN to page the UE via the first RAN, whereby the paging of the UE by the second RAN via the first RAN results in transition of the UE from being served by the first RAN in the first wireless coverage area to being served by the second RAN in the second wireless coverage area, wherein the engaging in signaling comprises an operation selected from the group consisting of (i) transmitting to an Internet Multimedia System (IMS) at least one signaling message configured to cause the IMS to transmit to the second RAN at least one signaling message configured to cause the second RAN to page the UE via the first RAN, and (ii) transmitting to a controller of the first RAN at least one signaling message configured to cause the controller of the first RAN to transmit to the second RAN at least one signaling message configured to cause the second RAN to page the UE via the first RAN.

6. The method of claim 5, wherein the first RAN includes a first base station that provides the first wireless coverage area, and wherein the method is carried out by the first base station.

7. The method of claim 5, carried out by the UE.

8. The method of claim 5, carried out while the UE is engaged in a call served by the IMS, wherein transitioning the UE from being served by the first RAN in the first wireless coverage area to being served by the second RAN in the second wireless coverage area comprises handing over the call from being via the first RAN to being via the second RAN.

9. The method of claim 5, wherein the UE is engaged in a voice over Internet Protocol (VoIP) call via the first base station, the method further comprising determining that the UE is at or approaching a position where there is no adjacent wireless coverage area of the first RAN that could support the VoIP call, wherein the engaging in signaling is responsive to at least the detecting and the determining.

10. The method of claim 5, carried out while the UE is engaged in a call, wherein the paging comprises Circuit Switched Fallback paging.

11. The method of claim 5, wherein the first RAN is a Long Term Evolution (LTE) RAN, and wherein the second RAN is a Code Division Multiple Access (CDMA) RAN.

12. In a wireless communication system comprising a first radio access network (RAN) and a second RAN, a base station of the first RAN comprising:

a wireless communication interface, including a radio and an antenna structure, configured to provide a wireless coverage area, wherein the base station serves a user equipment device (UE) in the wireless coverage area;

a network communication interface through which to engage in network communication; and a controller comprising a processing unit programmed to carry out operations, the operations including (i) detecting when the UE is at an edge of coverage of the wireless coverage area, (ii) responsive to at least the detecting, transmitting via the network communication interface a signaling message configured to cause the second RAN to page the UE via the first RAN, wherein the paging results in transition of the UE from being served by the first RAN to being served by the second RAN, wherein transmitting the signaling message comprises an operation selected from the group consisting of (i) transmitting the signaling message to an Internet Multimedia Subsystem (IMS), whereby the IMS in turn engages in signaling configured to cause the second RAN to page the UE via the first RAN and (ii) transmitting the signaling message to a controller of the first RAN, whereby the controller in turn engages in signaling configured to cause the second RAN to page the UE via the first RAN.

13. The base station of claim 12, wherein the UE is engaged in a call served by the IMS.

14. The base station of claim 12, wherein the paging of the UE comprises Circuit Switched Fallback (CSFB) paging.

15. The base station of claim 12, wherein the UE is engaged in a voice over Internet Protocol (VoIP) call via the base station, the operations further comprising determining that the UE is at a position where there is no adjacent wireless coverage area of the first RAN that could support the VoIP call, wherein the transmitting is responsive to at least the detecting and the determining.

\* \* \* \* \*